Patented Jan. 17, 1933

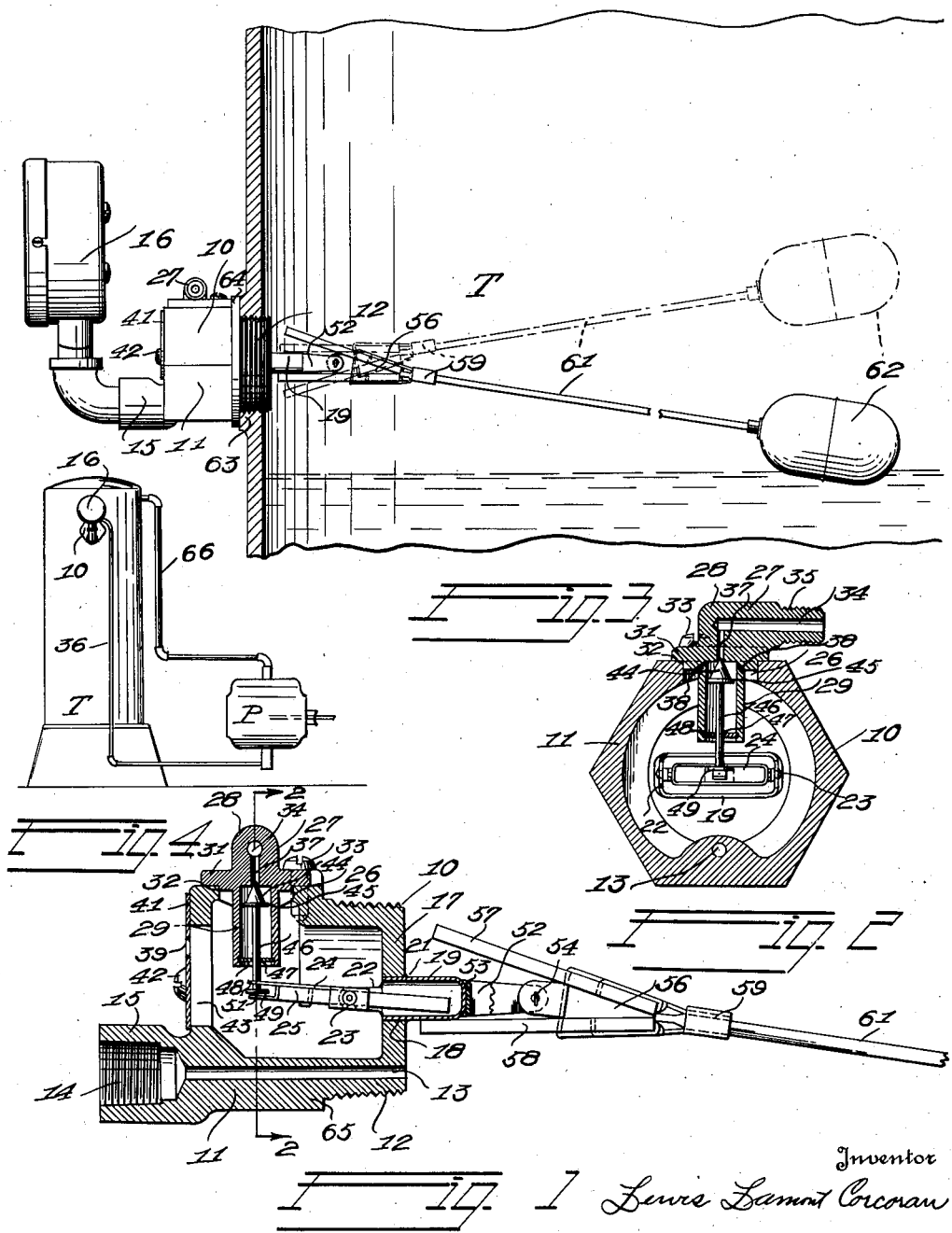

1,894,367

UNITED STATES PATENT OFFICE

LEWIS LAMONT CORCORAN, OF SELLERSVILLE, PENNSYLVANIA, ASSIGNOR TO UNITED STATES GAUGE COMPANY, OF NEW YORK, N. Y., A CORPORATION OF PENNSYLVANIA

AUTOMATIC CONTROL DEVICE

Application filed October 25, 1928. Serial No. 314,979.

The present invention relates to automatic control devices, and more particularly, the invention relates to a control device or mechanism for automatically maintaining a suitable volume of air or other gas in pressure tanks for water or other liquid distributing systems to force the water or liquid contained therein through surface pipes or distributing conduits associated therewith at predetermined pressures, or to maintain a predetermined liquid level in a chamber such for example as in the expansion chamber of a refrigerating system of the flooded type, or in steam boilers and the like.

For example, water distributing systems of the pneumatic pressure type usually embody an airtight storage or pressure tank into which water is intermittently pumped by a feed pump in a manner well known by those skilled in this art. In such systems, as water is pumped into the tank the air space therein is gradually reduced until the air trapped therein is compressed to a predetermined point at which it exerts a constant pressure on the water within the tank tending to force water from the tank through the distributing pipes or conduits.

The pumps used for forcing water into the tank are commonly provided with control means for automatically starting the pump when the pressure within the tank diminishes to a predetermined point as the air expands in forcing water out of the tank. The same control means automatically stops the pump upon restoration of a predetermined maximum pressure within the tank due to replacement of the water drawn therefrom.

In such systems of water distribution, a uniform supply of water under a substantially constant pressure for most effective operation could be maintained if a constant amount of air could be retained within the tank. However, as water is drawn from the tank some of the air escapes with the water and unless replaced the air within the tank gradually diminishes in volume with the result that a substantially constant pressure can be maintained for a comparatively short time only.

In large water supply systems of this character it has been common practice for an attendant to observe the volume of air forming the air cushion by means of a gauge mounted on the tank arranged to indicate the level of the water within the tank. In order to replenish the air supply it has been the practice to manually control an air inlet in the pump suction pipe in order that the pump may force air into the tank along with the water until the desired volume of air is restored in the tank as indicated by the gauge.

In order to keep a system of this character in efficient operation it is necessary to keep the gauge under constant observation and even then it is impossible to maintain a uniform supply of water under a substantially constant pressure.

To eliminate the necessity for manual control of such systems, various forms of float controlled devices have been proposed for automatically controlling admission of air to the suction side of the pump operating mechanically or magnetically through the walls of the tank. Such prior mechanical constructions have been of more or less complicated construction, unsatisfactory and unreliable in operation, and require pressure packings around the elements extending through the tank walls which are subject to deterioration and difficult to maintain fluid tight in operation. The prior magnetic constructions devised in an effort to avoid the packing and leakage troubles of the mechanical devices have been of complicated construction and of unreliable and impractical construction, and are too uncertain in operation to permit successful commercial use.

It is accordingly an object of this invention to provide improved, simplified and efficient controlling devices for automatically maintaining a uniform supply of water or liquid within a pressure tank under a substantially constant pressure for causing a substantially uniform flow as the water is withdrawn from the tank.

A further object of the invention is to provide automatic air or gas volume or other control devices of the character mentioned of comparatively simple construction, effective and accurate in operation, and which can be manufactured and installed at relatively low cost.

With these objects in view as well as others that will become apparent in the course of the following disclosure reference will be had to the accompanying drawing showing a preferred embodiment of the invention in which Fig. 1 is a substantially longitudinal sectional view through a preferred form of device embodying my invention.

Fig. 2 is a transverse sectional view on a plane indicated by line 2—2 in Fig. 1.

Fig. 3 is a fragmental sectional view of a pressure tank showing my invention in side elevation connected therewith and equipped with a pressure gauge and Fig. 4 is a diagrammatic side elevational view of a water pressure tank and pump operatively associated therewith illustrating the application of my invention.

Referring to the drawing by reference characters in which like characters designate like parts in the various figures, 10 designates a housing preferably of cast bronze and as illustrated comprises an angular tool engaging section 11 and a somewhat reduced externally threaded section 12. Housing 10 as illustrated may be provided in the base thereof with a bore 13 communicating at one end thereof with a threaded recess 14 in an extension 15 of housing 10 for the reception of a pressure gauge 16 which is preferably employed with the control device but forms no part of my present invention.

The end of section 12 of housing 10 is closed by a wall 17 which is provided with a substantially central aperture 18 in which is disposed the open end of a magnet supporting cup 19 soldered to wall 17 as indicated at 21. Cup 19 is provided at the opposite sides thereof with laterally alined forwardly extending projections 22 in the ends of which are formed suitable bearings 23 for the rear end of a magnet supporting clamp 24 thus providing a pivotal connection for clamp 24 permitting vertical oscillation thereof. A magnet 25 is embraced by clamp 24 the rear end thereof extending within cup 19 and the front end thereof extending forwardly within housing 10, cup 19 permitting oscillation of magnet 25 but limiting movement thereof by engagement of the respective end of magnet 25 with the opposing vertically spaced walls of cup 19.

Housing 10 is provided with an aperture 26 for the reception of a valve housing 27 which comprises an outer head member 28 and an inwardly directed open ended cylindrical member 29. Member 28 at the junction thereof with member 29 is provided with a flange 31 which is shouldered at 32 for accurate positioning of housing 27 within housing 10, a screw bolt 33 extending through flange 31 and into housing 10 serving to detachably connect housing 27 with housing 10.

Member 28, as indicated in Fig. 2, is of elongated formation and is provided with a bore 34 and is externally threaded at 35 for engagement of a pipe coupling for detachable connection of a pipe 36 (Fig. 4) whose opposite end is connected to the suction side of pump P. Member 28 is further provided with a vertically disposed bore 37 the outer end of which communicates with the inner end of bore 34. The inner end of bore 37 opens into cylindrical member 29 and is formed at its mouth to provide a valve seat. Member 29 adjacent the outer end thereof is provided with parts 38 which put the interior of member 29 into communication with the interior of housing 10 which is in communication with the atmosphere through an aperture 39 in a cover plate 41 detachably secured to housing 10 by bolts 42 for covering the assembling opening 43 therein.

Mounted within member 29 for vertical reciprocation is a valve structure comprising a conical valve 44 for cooperation with the valve seat defined by the mouth of bore 37 which at the base thereof is provided with a circular guiding flange 45. A valve stem 46 supporting valve 44 extends inwardly through a central guiding aperture 47 in a diaphragm 48 fixed within the inner end of member 29. The inner end of stem 46 is provided with a disk 49 for movement of rod 46 upon engagement of opposite sides thereof by extensions 51 of clamp 24.

A bracket 52 is suitably secured to cup 19 as indicated at 53 to which is pivotally secured as at 54 a magnet clamp 56 which supports a pair of magnets 57 and 58 in outward divergence toward cup 19 which cup serves as a limiting means for the pivotal movement of clamp 56 about fulcrum 54 by engagement of the free ends of magnets 57 and 58 with the respective opposite vertically disposed walls thereof.

Clamp 56 while functioning to retain magnets 57 and 58 in relative position is further provided with a sleeve or ferrule 59 for the reception of one end of a float rod 61 whose opposite end has secured thereto a float member 62.

The control device above described is adapted for installation in the following manner. Valve housing with valve 44 therein is assembled with housing 10 which has previously been provided with cup 19 whereupon clamp 24 supporting magnet 25 is assembled through opening 43 with extensions 51 of clamp 24 disposed on opposite sides of disk 49 after which cover plate 41 is secured to housing 10 for closing opening 43.

Thus assembled the structure is now connected with a pressure tank T by screwing threaded section 12 of housing 10 into an internally threaded boss 63 of tank T as indicated in Fig. 3, a suitable washer 64 being preferably interposed between a shoulder 65 on housing 10 and boss 63.

Clamp 56 supporting magnets 57 and 58 as well as float 62 is now pivotally connected to bracket 52 and pressure gauge 16 is connected with housing 10 through extension 15 thereof.

In operation, water is intermittently pumped into tank T by pump P through a pipe line 66 as indicated in Fig. 4, the pump being automatically started and stopped by means actuated by minimum and maximum pressures within the tank.

As illustrated in Figs. 1 and 3 float 62 due to a low level of water is in its lowermost position as a result of which valve 44 is closed due to an attraction between magnets 25 and 58 which due to the pivotal connection of magnet 25 forces the forward end thereof upward which through one of extensions 51 pushes rod 46 upward through disk 49.

In the position of parts illustrated pump "P" by its separate control means is set into operation for pumping water into tank T whereupon the level of the water within the tank will gradually rise imparting an upward movement to float 62 which through the pivotal connection of clamp 56 with bracket 52 will force magnet 57 downward toward cup 19 and after magnet 57 has passed through a relatively short arc the magnetic attraction between it and pivotally mounted magnet 25 will cause the latter to fly upward with a snap action into engagement with the outer wall of cup 19 which action will simultaneously force rod 46 inwardly through cooperating disk 49 and upper extension 51 thus opening valve 44 and admitting air through ports 38 and 39, bores 37 and 34 and piping 36 into the suction side of pump P which air will be pumped with the water into tank T until a sufficient volume of air has been introduced into tank T to provide a sufficient air cushion to cause an effective operating pressure on the water within the tank.

It will be observed that due to the magnetic attraction between magnets 25 and 57 valve 44 will be opened for the admission of air into pump P before float 62 has reached its upper limit position indicated by dot and dash lines in Fig. 3 thus allowing a substantial period of time for the pumping of combined air and water before the water level has reached the upper limit float position.

When float 62 has been raised by an elevation of water within the tank sufficient to open valve 44 the valve will remain open but the pump will be automatically stopped when a predetermined air pressure has been established. As the water level within the tank falls float 62 will likewise fall and valve 44 will be closed by a similar operation due to the magnetic attraction between magnets 25 and 58 and when the pump is set into operation with the water level such that float 62 is in its lowermost position the already existing air pressure within the tank may be sufficient that float 62 will not rise to a distance sufficient to open valve 44 as in this case no air is required but if the water level goes beyond this point a replenishing air supply is required and valve 44 is automatically opened by the aforedescribed attraction between magnets 25 and 57 when float 62 has risen to a predetermined point.

It will accordingly be seen that an automatic air volume control device for water system pressure tanks is provided which is comparatively simple in construction, reliable and effective in operation, and in which the valve housing is completely protected from the water in the pressure tank by comparatively simple and efficient means that permits relatively free movement of the float rod whereby the usual packing or stuffing boxes which are a source of a great deal of trouble and tend to restrict movement of the valve rod are entirely eliminated. As a result this device maintains accurately a substantially constant air pressure on a substantially constant volume of water.

While the control device is disclosed in connection with pressure tanks for water distribution systems, it is equally applicable to refrigerating expansion units, steam boilers and the like for the purpose of replenishing the liquid therein and to maintain a liquid level within predetermined limits by causing valve 45 to control the flow of liquid into the tank rather than the float of air to a pump. The valve 45 may also be replaced by a suitable electrical switch mechanism preferably of the snap acting type to control an electric motor drive for a liquid supply pump in a manner that will be apparent to those skilled in the art.

While I have disclosed certain specific embodiments of my invention such disclosure is to be considered as illustrative only and not restrictive, since the scope of the invention is defined in the subjoined claims. Accordingly, what I claim and desire to secure by U. S. Letters Patent is:

1. A device for automatically maintaining a volume of fluid within fluid chambers comprising a closed housing connected to the tank; a magnet mounted for movement in a vertical plane within said housing; a float pivotally connected externally of said housing; magnets supported by said float for movement in a vertical plane therewith for actuating through a wall of said housing said first magnet upon movement of said float; and control means operated by said first magnet.

2. A device for automatically maintaining predetermined fluid conditions in supply tanks comprising a housing connected to the tank; a float pivotally connected to said housing externally thereof for movement about an axis disposed externally of said housing; a control member; and magnetically operating means movable with said pivoted float for actuating said control member through a wall of said housing upon movement of said float occasioned by changes of level within the tank beyond predetermined limits.

3. A device for automatically maintaining a volume of air within water pressure supply tanks comprising a housing connected to said tank; an air control means within said housing; pivoted means within said housing for actuating said air control means; means pivoted to said housing externally thereof; a float within said tank and connected with said last means for movement thereof about an axis disposed externally of said housing upon an increase or decrease of volume of water within the tank, and magnetic means carried by said first and said second pivoted means for actuating said first pivoted means upon movement of said second pivoted means.

4. The construction defined in claim 3 in which said magnetic means comprises a magnet detachably supported by said first pivoted means and a pair of magnets detachably supported by said second pivoted means and disposed adjacent opposite sides of said first magnet.

5. A device for automatically maintaining a substantially constant volume of air within water pressure tanks comprising a closed housing detachably connected to said tank; air control means supported by said housing; a magnet pivotally connected within said housing and operatively connected with said air control means; a pair of magnets pivotally connected to said housing externally thereof but within said tank; a float connected to said pair of magnets for movement thereof upon the rise or fall of water within the tank; one or the other of said pair of magnets adapted by magnetic attraction through a wall of said housing to move said first magnet about its pivot for actuating said air control means.

6. A device for automatically maintaining a volume of air within water pressure supply tanks comprising a housing detachably connected to said tank; air inlet control means within said housing; a magnet pivotally mounted for vertical movement within said housing; means carried by said magnet for actuating said air inlet control means; a pair of spaced magnets pivoted to said housing within said tank for simultaneous movement; a float connected with said pair of magnets for movement thereof upon change of volume of water within said tank whereby upon a predetermined degree of movement of said pair of magnets one or the other thereof will magnetically attract said first magnet for actuating said air inlet control means with a snap action through a wall of said housing.

7. The construction defined in claim 6 in which said first magnet and said pair of magnets are detachably held in position by clamps each embracing a portion of a magnet.

8. The construction defined in claim 6 in which a cup member is supported by said housing and projecting in said tank but opening inwardly in the housing; said cup member provided with projections having bearings within said housing for said first magnet; and a bracket secured to said cup member externally thereof and provided with bearings for said pair of magnets.

9. A device for automatically maintaining a substantially constant volume of air within water pressure tanks comprising a housing detachably secured to said tank; a wall of said housing having valve mechanism secured thereto; a cup member secured to said housing with its open end in communication therewith; said cup member provided with inwardly extending projections; a clamp pivoted to said projections and operatively connected with said valve mechanism; a magnet detachably supported by said clamp and projecting within said cup member; a bracket secured externally to said cup member within said tank; a second clamp pivotally connected to said bracket; a pair of magnets detachably supported by said second clamp; a float carried by said second clamp whereby upon rise or fall of the level of water within said tank one or the other of said pair of magnets will approach said first magnet and by magnetic attraction impart movement thereto for opening or closing said valve through said cup shaped member.

10. The construction defined in claim 9 in which opposite portions of the wall of said cup member constitute stops for said first magnet and other external portions thereof constituting stops for said pair of magnets to limit movement thereof about their pivotal connections.

11. The construction defined in claim 9 in which said pair of magnets are disposed in diverging relation and arranged to engage opposite sides of said cup shaped member.

12. A device for maintaining a substantially constant volume of air within water pressure tanks comprising a housing detachably secured to said tank; an air inlet control means supported by said housing; a magnet pivotally supported within said housing for actuating said air inlet control means; a pair of magnets pivotally connected without said housing for magnetically operating said first magnet upon approach of one or the other of said pair of magnets thereto; and a float carried by said pair of magnets for moving same about their pivotal connection upon the rise or fall of the level of water within said tank.

13. The construction defined in claim 12 in which said first magnet and said pair of magnets are pivotally connected to a cup member opening in said housing and secured within an aperture in said housing.

14. An air volume control apparatus comprising a housing provided with means to detachably connect it to a tank with one wall thereof facing inwardly of said tank, said wall supporting a plurality of magnetic arranged externally and internally of said housing, another wall of said housing having a removable portion carrying a valve mechanism, another wall of said housing having a removable portion to permit access to the interior thereof and another portion of a wall of said housing being provided with a passage opening into said tank through said first named wall.

15. An air volume control device comprising a fitting in the form of a housing provided with means whereby said fitting may be removably secured in an opening in the wall of a tank, an arm mounted for swinging movement in a vertical plane within said housing, a reciprocatory air valve actuated by said arm, an elongated float, a float arm secured to said float so that the length of said arm and float extend in the same direction as said arm within said housing, and mechanism operatively connecting said arm within said housing and said float arm disposed without the housing so that swinging movement of said float arm causes a movement of the arm within said housing in the plane in which the longitudinal axis of said float moves.

In testimony whereof I affix my signature.

LEWIS LAMONT CORCORAN.